United States Patent [19]

Motegi et al.

[11] Patent Number: 4,975,472
[45] Date of Patent: Dec. 4, 1990

[54] CURABLE ORGANOPOLYSILOXANE COMPOSITION

[75] Inventors: Tsuneo Motegi; Yasuji Matsumoto, both of Gunma, Japan

[73] Assignee: Toshiba Silicone Co., Ltd., Tokyo, Japan

[21] Appl. No.: 347,851

[22] Filed: May 5, 1989

[30] Foreign Application Priority Data

May 9, 1988 [JP] Japan .................................. 63-112107

[51] Int. Cl.$^5$ .............................................. C08F 2/46
[52] U.S. Cl. ........................................ 522/33; 522/40; 522/43; 522/46; 522/48; 522/144; 522/170; 522/148; 522/172; 528/26; 528/34
[58] Field of Search ................... 522/148, 172, 33, 40, 522/43, 46, 48, 144, 170; 528/26, 34

[56] References Cited

U.S. PATENT DOCUMENTS 4,526,955  7/1985  Bennington et al. ............... 522/172
4,623,676  11/1986  Kistner ................................. 522/170

Primary Examiner—Melvyn I. Marquis
Attorney, Agent, or Firm—Sughrue, Mion, Zinn, Macpeak & Seas

[57] ABSTRACT

A curable organopolysiloxane composition having condensation-curing properties and ultraviolet-curing properties, comprising (A) a diorganopolysiloxane having a viscosity of 50 to 200,000 cSt, both ends of each molecule thereof being blocked with a silanol group, (B) a silane compound, (C) an (alkyl)acrylic acid derivative, (D) a catalyst for condensation and (E) a sensitizer.

4 Claims, No Drawings

CURABLE ORGANOPOLYSILOXANE COMPOSITION

FIELD OF THE INVENTION

This invention relates to a curable composition containing an organopolysiloxane. More particularly, it relates to an organopolysiloxane composition having both condensation-curing properties and ultraviolet-curing properties.

BACKGROUND OF THE INVENTION

As curable organopolysiloxane compositions, compositions having condensation-curing properties and compositions having ultraviolet-curing properties are well known.

The condensation-curing type organopolysiloxane composition is cured through the condensation of an organopolysiloxane having silanol groups and an organosilicon compound having hydrolyzable groups by the action of a tin compound or a titanium compound as disclosed in, for example, JP-B-38-16798 and JP-B-40-21631. (The term "JP-B" as used herein means an "examined Japanese patent publication".) The compositions of this type cure at room temperature due to moisture in air and do not result in poor curing, being different from an addition reaction-type composition. For this reason, those compositions are used as a building sealant, a coating composition, a modeling material, a roller for a copying machine, etc.

However, the condensation-curing type organopolysiloxane composition suffers from a disadvantage that because curing is due to moisture that has penetrated thereinto, the same cannot be used as an adhesive or the like where fixed parts must be moved prior to complete curing, for example, in the case of temporarily fixing pieces to be joined, although the applied composition, including the interior thereof, will cure uniformly if it is allowed to stand for a long period of time.

On the other hand, as the ultraviolet-curing type organopolysiloxane composition, the following compositions have been proposed:

(1) a composition which comprises a vinyl group-containing organopolysiloxane and various sensitizers and which cures upon exposure to high-intensity ultraviolet rays (U.S. Pat. No. 3,726,710);

(2) a composition comprising a mercapto group-containing organopolysiloxane, methylvinyl polysiloxane and various peroxides (U.S. Pat. No. 3,816,282);

(3) a composition comprising a vinyl group-containing organopolysiloxane, an organohydrogen polysiloxane and a sensitizer (JP-B-52-40334); and (4) a composition comprising an organopolysiloxane containing an acrylic-type unsaturated group and a sensitizer (JP-A-48-19682). (The term "JP-A" as used herein means an "unexamined published Japanese patent application".)

Those compositions all cure instantaneously when irradiated with ultraviolet rays, but have the disadvantage that the interior of the composition when it is applied thickly or parts thereof which are shadowed from the ultraviolet rays are not affected by the ultraviolet rays and remain uncured.

In order to eliminate those disadvantages of the compositions of the two types mentioned, a composition comprising a diorganopolysiloxane in which both ends of the molecule have been blocked with a hydroxyl group, a vinylsilane having a hydrolyzable group, an organosiloxane having a mercapto group, a curing catalyst and a sensitizer has been proposed as a composition having both condensation-curing properties and ultraviolet-curing properties as disclosed in, for example JP-A-60-23176. However, this composition is disadvantageous in that it emits, when reacting, the offensive odor inherent in mercapto group-containing compounds and it attacks metals, when heated, and converts them into sulfides.

Further, a composition comprising an organopolysiloxane having as a terminal group an acryldialkoxysilyl group or an acryldiallyloxysilyl group, a catalyst for moisture curing, and a photosensitizer has been proposed as disclosed in, for example, JP-A-61-127718 and JP-A-61-276810. However, the composition of this type shows poor environmental resistance such as heat resistance and low-temperature resistance, and is also disadvantageous in that it tends to undergo inhibition of curing by oxygen in air.

SUMMARY OF THE INVENTION

As a result of extensive investigations to develop a novel composition free from the disadvantages in the conventional compositions, it has been found that the disadvantages of the conventional compositions can be eliminated by modifying a conventional condensation-curing composition so as to be cured by ultraviolet irradiation. The present invention has been completed based on the above finding.

Accordingly, an object of the present invention is to provide a curable composition which has both rapid-curing properties due to ultraviolet curing and interior-curing properties due to condensation curing, and is free from the offensive odor and the inhibition of curing by oxygen in air, which are encountered in the conventional compositions.

DETAILED DESCRIPTION OF THE INVENTION

The curable organopolysiloxane composition according to the present invention comprises (A) 100 parts by weight of a diorganopolysiloxane having a viscosity as measured at 25° C. of 50 to 200,000 cSt, both ends of each molecule thereof being blocked with a silanol group, (B) 1 to 30 parts by weight of a silane compound represented by the formula (1):

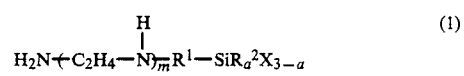

wherein $R^1$ represents a divalent hydrocarbon group, $R^2$ represents a monovalent hydrocarbon group, X represents a hydroxyl group or a hydrolyzable group, m is an integer of 0 to 4, and a is 0 or 1, (C) an (alkyl)acrylic acid derivative represented by the formula (2):

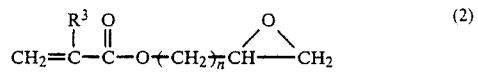

wherein $R^3$ represents a hydrogen atom or an alkyl group having 1 to 4 carbon atoms, and n is an integer of 1 to 10, the amount of the (meth)acrylic acid derivative being equal to or more than the amount of component (B) in terms of molar amount, (D) 0.0001 to 10 parts by weight of a catalyst for condensation, and (E) 0.01 to 20 parts by weight of a sensitizer.

Component (A) in the composition of this invention is a diorganopolysiloxane having terminal silanol groups which is generally used for room temperature-curing condensed polysiloxane compositions of this kind. The viscosity of component (A) should be in the range of from 50 to 200,000 cSt as measured at 25° C., especially in order to impart appropriate extrudability to the composition before curing and, at the same time, impart excellent mechanical properties to the cured rubber-like elastomer. If the viscosity is below 50 cSt, the cured elastomeric composition shows insufficient elongation, while if it is higher than 200,000 cSt, a uniform composition cannot be obtained and the resulting composition shows poor extrudability. A particularly preferred range of the viscosity is from 100 to 150,000 cSt, from the standpoint of attaining well-balanced properties between the composition before curing and after curing.

Organic groups directly bonded to silicon atoms in the diorganopolysiloxane include, for example, an alkyl group (such as methyl, ethyl, propyl, butyl or hexyl), an alkenyl group (such as vinyl or allyl), an aryl group (such as phenyl), an aralkyl group (such as styrenyl) and a monovalent substituted hydrocarbon group (such as 3,3,3-trifluoropropyl, chloromethyl or β-cyanoethyl). Of these, a monovalent hydrocarbon group such as methyl, vinyl or phenyl is preferred, because of easy synthesis of the diorganopolysiloxane. Other organic groups are recommended only where it is required to impart specific properties such as oil resistance and coatability to the cured rubber-like elastomer. Of the above-described preferred organic groups, methyl is especially preferred, because not only can an intermediate for the polysiloxane be most easily obtained, but also the methyl group is most effective for the preparation of a polysiloxane which has a low viscosity but has a high degree of polymerization and, hence, serves to balance the extrudability of the uncured composition and the properties of the cured rubber-like elastomer. Therefore, it is preferred that 85% or more of all the organic groups in component (A) are methyl, and more preferably, substantially all of the organic groups are methyl. However, in the case where it is required to impart low-temperature resistance and heat resistance to the cured rubber-like elastomer, it is recommended that part of the organic groups are phenyl.

Component (B) in the composition of this invention is a silane compound represented by the formula (1):

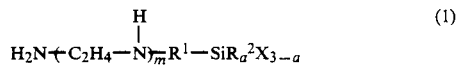

(1)

wherein $R^1$, $R^2$, a, m and X are the same as defined above.

Examples of the divalent hydrocarbon group represented by $R^1$ include an alkylene group (such as methylene, ethylene or propylene) and an arylene group (such as phenylene).

The group represented by $R^2$ is a substituted or unsubstituted monovalent hydrocarbon group. Examples of this group $R^2$ include an alkyl group (such as methyl, ethyl, propyl or butyl), an alkenyl group (such as vinyl or allyl), an aryl group (such as phenyl) and a group which is the same as each of the above groups except that the hydrogen atoms thereof have been partially substituted with a halogen atom or atoms or others. Of those, preferred are an alkyl group having 1 to 8 carbon atoms, an alkenyl group having 2 to 3 carbon atoms and a phenyl group, because of the easy synthesis and crosslinking rate of this organosilicon compound. Methyl is most preferred.

Examples of the hydrolyzable group represented by X include an alkoxy group (such as methoxy, ethoxy, propoxy or butoxy), an alkoxyalkoxy group (such as 2-methoxyethoxy or 2-ethoxyethoxy), an alkenyloxy group (such as propenoxy), an acyloxy group (such as acetoxy or octanoyloxy), a ketoxime group (such as acetone oxime or methyl ethyl ketoxime), an organoamino group (such as diethylamino, butylamino, hexylamino or cyclohexylamino), a diorganoaminooxy group (such as dimethylaminooxy or diethylaminooxy), and an organoamido group (such as N-methylacetamido).

Of the above-described hydrolyzable groups, methoxy, ethoxy, propoxy, isopropenoxy, acetoxy, methyl ethyl ketoxime, diethylamino, diethylaminooxy and N-methylacetamido groups are preferred, because of easy synthesis of the silane compound and the curing rate of the composition. In the case where the composition is used in the electrical or electronic field, methoxy, ethoxy and isopropenoxy are especially preferred, because the composition should not corrode various metals.

Examples of the component (B) include γ-aminopropyltriethoxysilane, 3-ethylenediaminopropyltrimethoxysilane, 3-ethylenediaminopropylmethyldimethoxysilane, γ-aminopropyltriisopropenoxysilane and 3-ethylenediaminopropyltriisopropenoxysilane.

The amount of component (B) in the composition of this invention is from 1 to 30 parts by weight, preferably from 3 to 20 parts by weight, per 100 parts by weight of component (A).

If the amount of component (B) is too small, the curing reaction due to moisture is insufficient, while too large amounts are also disadvantageous in that the cured composition becomes too hard.

Component (C) in the composition of this invention is represented by the formula (2):

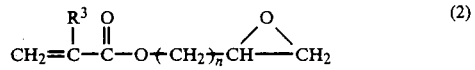

(2)

wherein $R^3$ and n are the same as defined above.

Examples of the alkyl group represented by $R^3$ include methyl, ethyl, propyl and butyl. $R^3$ may also be a hydrogen atom.

Examples of the component (C) include glycidyl acrylate, glycidyl methacrylate, 3,4-epoxybutoxy acrylate, and 4,5-epoxypentoxy methacrylate. The amount of component (C) in the composition should be equal to or more than the amount of component (B) in terms of molar amount, and it is preferably 1.5 mole or more per mole of the component (B).

It is believed that due to the synergistic effect of components (B) and (C), not only does the composition of the present invention exhibit good adhesion to various substances but also the ultraviolet curing of the composition is substantially unaffected by oxygen in air.

Examples of the catalyst, component (C), in the composition of this invention, which serves to accelerate condensation, include amine compounds such as dimethylhexylamine, diethylhydroxylamine and tetramethylguanidine; quaternary ammonium salts such as tetramethylammonium chloride and trimethylhexylammonium chloride; metal salts of organic acids such as zinc octoate, tin octoate, dibutyltin diacetate, dibutyltin dioctoate, dibutyltin dilaurate and dioctyltin dilaurate; and titanium compounds such as tetrapropyl titanate, tetrabutyl titanate, dipropoxybis(acetylacetonate)titanium, dipropoxybis(ethyl acetoacetato)titanium, 1,3-dioxypropanebis(acetylacetonato)titanium and 1,3-dioxypropanebis(ethylacetoacetato)titanium.

Of those, the organotin compounds and the organotitanium compounds are effective because of their strong catalytic activities.

The amount of component (D) in the composition varies depending upon the kind thereof, but is generally from 0.0001 to 10 parts by weight, preferably from 0.001 to 5 parts by weight, per 100 parts by weight of component (A). If the amount thereof is too small, the curing reaction due to moisture is insufficient. If it is too large, not only desired effects cannot be obtained, but also heat resistance and other properties are adversely affected.

Component (E) in the composition of this invention is excited by ultraviolet irradiation, causing radical reaction, and therefore serves to cure the composition of this invention upon exposure to ultraviolet light.

Examples of such component (E) include ketone-type or ether-type compounds such as acetophenone, benzophenone, benzoin propyl ether, benzoin butyl ether, diethoxyacetophenone, 2-methyl-2-hydroxypropiophenone, 1-(4-isopropylphenyl)-2-hydroxy-2-methylpropanone and 2-hydroxy-2-methyl-1-phenylpropane-1-one; and quinone-type compounds such as benzoquinone, anthraquinone and 1,2-naphthoquinone.

The amount of component (E) in the composition is from 0.01 to 20 parts by weight per 100 parts by weight of component (A). The preferred amount thereof is in the range of from 0.1 to 5 parts by weight. If the amount is too small, the curing of the composition is too slow and a sufficient crosslinking effect cannot be obtained. On the other hand, if it is too large, desired effects cannot be obtained.

The composition of this invention should be preserved in a sealed state such that ultraviolet light is kept excluded therefrom, since the composition cures due to both moisture and ultraviolet irradiation.

The composition of the invention can be obtained by blending component (A), component (B) and component (D) while moisture is kept excluded from the system, blending component (C) therewith, and finally blending component (E) therewith while light and moisture are kept excluded from the system.

If desired and necessary, a filler, a pigment, a heat stabilizer, an adhesion promoter, a flame retarder, a flowability-regulating agent, an antifungal substance, or the like may optionally be incorporated in the composition of this invention. Further, a solvent may be added according to use of the composition, and an organopolysiloxane of another kind may also be incorporated so long as the effect of the present invention is not impaired.

Examples of such additives optionally used include fillers such as fumed silica, precipitated silica, ground quartz, diatomaceous earth, titanium oxide, aluminum oxide, zinc oxide, iron oxide, mica, clay, carbon black, graphite, glass beads, a metal powder and calcium carbonate; additives for improving heat resistance or flame retardancy such as zinc carbonate, manganese carbonate, cerium oxide and cerium hydroxide; an agent for improving adhesion; solvents such as toluene, xylene and n-hexane; and viscosity modifiers such as dimethyl polysiloxane.

By the use of the composition of the present invention, provisional fixing of parts on a substrate can be instantaneously accomplished by irradiating the applied composition with ultraviolet rays, and further, even the interior or shadoWed parts of the applied composition layer, in which a curing reaction due to ultraviolet irradiation does not occur, can be completely cured by means of condensation due to moisture. Further, since the composition does not contain a mercapto group-containing silicone compound, it is free from offensive odor during reaction and does not substantially corrode substrates. Moreover, the composition is substantially free from the curing inhibition by oxygen in air.

Therefore, the composition of the present invention can be advantageously used in the case where parts which have been provisionally fixed in the potting of electrical or electronic parts or in other processes should be moved soon after the fixing, and can greatly reduce the time required for such a process. Further, where the composition is used for coating hybrid integrated circuits or printed circuit boards, on both of which bulky parts (for example, 5 mm- to 20 mm-high condensers, resistors and coils) are mounted, not only can the protection of the coated components from moisture be improved, but also the troublesome control of ultraviolet irradiation for ultraviolet curing can be eliminated, because even the parts shadowed from the ultraviolet light will cure. Hence, the composition of this invention is useful for simplifying the process for the production of electrical or electronic products.

The present invention will be explained in more detail by reference to the following Examples, which should not be construed to be limiting the scope of the invention. In the Examples, all parts are by weight, and the viscosity is the value measured at 25° C.

EXAMPLE 1

100 Parts of dimethyl polysiloxane having a viscosity of 3,000 cSt in which both ends of the molecule had been blocked with a silanol group, 5 parts of 3-ethylenediaminopropyltrimethoxysilane and 2 parts of tetraisopropyl titanate were uniformly mixed while moisture was kept excluded from the system. To the resulting mixture were added 12 parts of glycidyl acrylate and 0.5 parts of acetophenone, with moisture being kept excluded, and the mixture was mixed uniformly, thereby obtaining a composition, S-1, of the present invention.

For comparison, a comparative composition, R-1, containing no condensation catalyst was prepared under the same conditions as above for S-1 except that tetraisopropyl titanate was not used.

The two compositions were separately poured into a polytetrafluoroethylene-coated mold to form a 2 mm thick molded article, and the molded article was cured under the various conditions as shown in Table 1. After curing operations, the thickness of the cured portion and the hardness (JIS K 6301 Type A) were measured on each molded composition. The results obtained are shown in Table 1.

TABLE 1

| Curing Conditions* | | Sample | |
|---|---|---|---|
| | | S-1 | R-1 |
| I | Cured thickness (mm) | 0.4 | 0.4 |
| | Hardness | — | — |
| II | Cured thickness (mm) | 2.0 | 2.0 |
| | Hardness | 25 | 25 |
| III | Cured thickness (mm) | 2.0 | 0 |
| | Hardness | 20 | — |
| IV | Cured thickness (mm) | 2.0 | 0.4 |
| | Hardness | 22 | — |

Note
*I: 10 Second irradiation with light from a high-pressure mercury lamp (160 W/cm) for generating ozone, which was placed at a distance of 10 cm from sample.
II: 30 Second irradiation with light from a high-pressure mercury lamp (160 W/cm) for ozone, which was placed at a distance of 5 cm from sample.
III: Samples were allowed to stand for 48 hours at 25° C. under 60% RH.
IV: Samples were irradiated with ultraviolet rays under the conditions of I, and then allowed to stand under the conditions of III.

EXAMPLE 2

Into a round flask equipped with a stirrer were introduced 100 parts of dimethyl polysiloxane having a viscosity of 700 cSt in which both ends of the molecule had been blocked with a silanol group, and 10 parts of 3-ethylenediaminopropyltrimethoxysilane. While removing methanol by-produced, the contents were allowed to react at 80° C. for 2 hours under a pressure of 10 mmHg, and then at 80° C. for 4 hours under a pressure of 0.5 mmHg. After completion of the reaction, the contents were cooled to 50° C. 26.1 Parts of glycidyl methacrylate were then added dropwise thereto over a period of about 15 minutes to cause the reaction to proceed with stirring at 65° C. for 6 hours, thereby preparing a composition, B-1.

100 Parts of B-1 thus obtained was uniformly mixed with 1 part of acetophenone and 0.1 part of dibutyltin dilaurate, while moisture was kept excluded, thereby obtaining a composition, S-2, of the present invention.

For comparison, a comparative composition, R-2, containing no condensation catalyst was prepared under the same conditions as above for S-2 except that dibutyltin dilaurate was not used.

The two compositions were separately poured into a polytetrafluoroethylene-coated mold to form a 2 mm thick molded article, and the molded article was cured under the various conditions as shown in Table 2. After curing operations, the thickness of the cured portion and the hardness (JIS K 6301 Type A) were measured on each molded composition. The results obtained are shown in Table 2.

TABLE 2

| Curing Conditions* | | Sample | |
|---|---|---|---|
| | | S-2 | R-2 |
| I | Cured thickness (mm) | 0.6 | 0.6 |
| | Hardness | — | — |
| II | Cured thickness (mm) | 2.0 | 2.0 |
| | Hardness | 30 | 30 |
| III | Cured thickness (mm) | 2.0 | 0 |
| | Hardness | 27 | — |
| IV | Cured thickness (mm) | 2.0 | 0.6 |
| | Hardness | 33 | — |

Note *Curing conditions are the same as in Table 1.

EXAMPLE 3

100 Parts of dimethyl polysiloxanc containing 5 mol% phenyl groups and having a viscosity of 1,500 cSt in which both ends of the molecule had been blocked with a silanol group, 6.0 parts of γ-aminopropyltriethoxysilane, 0.8 part of tetraisopropyl titanate and 11.5 parts of glycidyl acrylate were mixed, thereby preparing a composition, B-2. 100 Parts of B-2 thus obtained was mixed with 1.5 parts of acetophenone in the same manner as in Example 2, thereby obtaining a composition, S-3, of the present invention.

Composition S-3 thus obtained was poured into the mold as used in Example 1, and then irradiated with ultraviolet rays under curing conditions I in Table 1. As a result, a 1 mm thick surface portion of the composition was cured into a rubber-like elastomer. Further, under conditions II, the composition was cured over the thickness of 2 mm only by a 15 second ultraviolet irradiation. Furthermore, under the conditions of either III or IV, the composition was cured over the thickness of 2 mm into a rubber-like elastomer.

EXAMPLE 4

With respect to composition S-1 as obtained in Example 1, adhesion to various substrates (aluminum, glass, copper, epoxy resin and phenol resin) was evaluated. As a result, it showed good adhesion to all the substrates. Curing conditions for this adhesion test were the same as conditions IV in Table 1.

While the invention has been described in detail and with reference to specific embodiments hereof, it will be apparent to one skilled in the art that various changes and modifications can be made therein without departing from the spirit and scope thereof.

What is claimed is:

1. A curable organopolysiloxane composition comprising
   (A) 100 parts by weight of a diorganopolysiloxane having a viscosity as measured at 25° C. of 50 to 200,000 cSt, both ends of each molecule thereof being blocked with a silanol group,
   (B) 1 to 30 parts by weight of a silane compound represented by the formula (1):

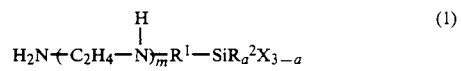

$$H_2N+C_2H_4-N)_{\overline{m}}R^1-SiR_a^2X_{3-a} \quad (1)$$

wherein $R^1$ represents a divalent hydrocarbon group, $R^2$ represents a monovalent hydrocarbon group, X represents a hydroxyl group or a hydrolyzable group, m is an integer of 0 to 4, and a is 0 or 1,
   (C) an (alkyl)acrylic acid derivative represented by the formula (2):

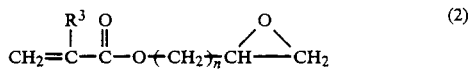

$$CH_2=\overset{R^3}{\underset{|}{C}}-\overset{O}{\underset{\|}{C}}-O+CH_2)_{\overline{n}}CH\overset{O}{\underset{\diagdown}{\diagup}}CH_2 \quad (2)$$

wherein $R^3$ represents a hydrogen atom or an alkyl group having 1 to 4 carbon atoms, and n is an integer of 1 to 10, the amount of said (alkyl)acrylic acid derivative being equal to or more than the amount of component (B) in terms of molar amount,
   (D) 0.0001 to 10 parts by weight of a catalyst for condensation, and
   (E) 0.01 to 20 parts by weight of a sensitizer.

2. A composition as claimed in claim 1, wherein organic groups bonded to silicon atoms in component (A) are methyl or phenyl.

3. A composition as claimed in claim 1, wherein said hydrolyzable group in component (B) is alkoxy or alkenyloxy.

4. A composition as claimed in claim 1, wherein said catalyst for condensation of component (D) is an organotitanium compound and/or an organotin compound.

* * * * *